(12) United States Patent
Postic et al.

(10) Patent No.: US 11,267,546 B2
(45) Date of Patent: Mar. 8, 2022

(54) OCEAN BOTTOM SEISMIC AUTONOMOUS UNDERWATER VEHICLE

(71) Applicant: Seabed Geosolutions B.V., Leidschendam (NL)

(72) Inventors: Erwan Francois Marie Postic, Houston, TX (US); Thierry Brizard, Ollainville (FR)

(73) Assignee: Seabed Geosolutions B.V., Leidschendam (NL)

( * ) Notice: Subject to any disclaimer, the term of this patent is extended or adjusted under 35 U.S.C. 154(b) by 0 days.

(21) Appl. No.: 16/738,653

(22) Filed: Jan. 9, 2020

(65) Prior Publication Data

US 2020/0148321 A1 May 14, 2020

Related U.S. Application Data

(63) Continuation of application No. 15/888,917, filed on Feb. 5, 2018, now Pat. No. 10,543,892.

(Continued)

(51) Int. Cl.
  *B63G 8/00* (2006.01)
  *B63G 8/16* (2006.01)
  (Continued)

(52) U.S. Cl.
  CPC ............ *B63G 8/001* (2013.01); *B63G 8/16* (2013.01); *G01V 1/247* (2013.01); *G01V 1/3808* (2013.01);
  (Continued)

(58) Field of Classification Search
  CPC .... B63G 8/00; B63G 8/001; B63G 2008/002; B63G 2008/004
  See application file for complete search history.

(56) References Cited

U.S. PATENT DOCUMENTS

| 3,256,849 A | 6/1966 | Lehmann |
| 3,492,965 A | 2/1970 | Wayfield |

(Continued)

FOREIGN PATENT DOCUMENTS

| CN | 102213594 A | 10/2011 |
| EP | 1217390 A1 | 6/2002 |

(Continued)

OTHER PUBLICATIONS

International Search Report in corresponding International Application No. PCT/EP2012/069144, dated Feb. 4, 2013.

(Continued)

*Primary Examiner* — Andrew Polay
(74) *Attorney, Agent, or Firm* — Park, Vaughan, Fleming & Dowler LLP; Shane Nelson

(57) ABSTRACT

Seismic autonomous underwater vehicles (AUVs) for recording seismic signals on the seabed. The AUV may be negatively buoyant and comprise an external body (which may be formed of multiple housings) that substantially encloses a plurality of pressure housings. Portions of the external body housing may be acoustically transparent and house one or more acoustic devices for the AUV. The AUV may comprise a main pressure housing that holds substantially all of the electronic components of the AUV, while a second and third pressure housing may be located on either side of the main pressure housing for other electronic components (such as batteries). A plurality of external devices (such as acoustic devices or thrusters) may be coupled to the main pressure housing by external electrical conduit. The AUV may comprise fixed or retractable wings for increased gliding capabilities during subsea travel.

8 Claims, 11 Drawing Sheets

Related U.S. Application Data

(60) Provisional application No. 62/455,409, filed on Feb. 6, 2017.

(51) Int. Cl.
*G01V 1/24* (2006.01)
*G01V 1/38* (2006.01)

(52) U.S. Cl.
CPC ........ *G01V 1/3852* (2013.01); *B63B 2211/02* (2013.01); *B63G 2008/004* (2013.01)

(56) References Cited

U.S. PATENT DOCUMENTS

| | | | |
|---|---|---|---|
| 5,253,605 A | 10/1993 | Collins | |
| 5,758,592 A | 6/1998 | Benson, Jr. | |
| 5,894,450 A | 4/1999 | Schmidt et al. | |
| 6,230,840 B1 | 5/2001 | Ambs | |
| 6,390,012 B1 | 5/2002 | Watt et al. | |
| 6,474,254 B1 | 11/2002 | Ambs et al. | |
| 6,482,054 B2 | 11/2002 | Treaster et al. | |
| 6,625,083 B2 | 9/2003 | Vandenbroucke | |
| 6,640,740 B1 * | 11/2003 | French | B63G 8/001 114/330 |
| 6,779,475 B1 | 8/2004 | Crane et al. | |
| 6,829,197 B2 | 12/2004 | Erikson | |
| 6,932,185 B2 | 8/2005 | Bary et al. | |
| 6,951,138 B1 | 10/2005 | Jones | |
| 7,016,260 B2 | 3/2006 | Bary | |
| 7,124,698 B1 | 10/2006 | Shen et al. | |
| 7,148,416 B1 | 12/2006 | Rice | |
| 7,183,742 B2 | 2/2007 | Potter et al. | |
| 7,252,046 B1 | 8/2007 | Ead et al. | |
| 7,796,466 B2 | 9/2010 | Combee et al. | |
| 7,965,583 B2 | 6/2011 | Thomas | |
| 8,025,021 B2 | 9/2011 | Gosling | |
| 8,096,254 B1 | 1/2012 | Bauer et al. | |
| 8,109,223 B2 | 2/2012 | Jamieson | |
| 8,576,658 B2 | 11/2013 | Thomas | |
| 8,677,921 B2 | 3/2014 | Gosling | |
| 8,717,844 B2 | 5/2014 | Welker et al. | |
| 9,052,380 B2 | 6/2015 | Winter et al. | |
| 9,090,319 B2 | 7/2015 | Brizard et al. | |
| 9,174,713 B2 | 11/2015 | Item et al. | |
| 9,381,986 B2 | 7/2016 | Brizard | |
| 9,457,879 B2 | 10/2016 | Brizard | |
| 9,829,589 B2 | 11/2017 | Ray et al. | |
| 10,322,783 B2 | 6/2019 | Valsvik et al. | |
| 2003/0164134 A1 | 9/2003 | King | |
| 2007/0051292 A1 | 3/2007 | Kilbourn et al. | |
| 2010/0000459 A1 | 1/2010 | Colangelo | |
| 2010/0157727 A1 | 6/2010 | Woodard, Jr. et al. | |
| 2010/0182870 A1 | 7/2010 | Norris et al. | |
| 2010/0302901 A1 | 12/2010 | Welker et al. | |
| 2011/0297121 A1 | 12/2011 | Kraus et al. | |
| 2012/0020185 A1 | 1/2012 | Welker et al. | |
| 2012/0057430 A1 | 3/2012 | Roquette et al. | |
| 2012/0069702 A1 | 3/2012 | Muyzert et al. | |
| 2012/0210836 A1 | 8/2012 | Wiggins et al. | |
| 2012/0289103 A1 | 11/2012 | Hudson et al. | |
| 2014/0053768 A1 * | 2/2014 | Brizard | G01V 1/3843 114/321 |
| 2014/0078861 A1 | 3/2014 | Tamanja | |
| 2014/0140170 A1 | 5/2014 | Brizard | |
| 2014/0230714 A1 | 8/2014 | Sylvia et al. | |
| 2014/0251199 A1 | 9/2014 | Brizard | |
| 2014/0259618 A1 | 9/2014 | Damus et al. | |
| 2014/0290554 A1 | 10/2014 | Brizard | |
| 2014/0301161 A1 | 10/2014 | Brizard et al. | |
| 2015/0136012 A1 * | 5/2015 | Williams | B63G 8/001 114/312 |
| 2015/0210359 A1 | 7/2015 | McClure | |
| 2015/0331126 A1 | 11/2015 | Lambert et al. | |
| 2015/0336645 A1 | 11/2015 | Brizard et al. | |
| 2016/0124105 A1 | 5/2016 | Valsvik et al. | |
| 2017/0137098 A1 | 5/2017 | Valsvik et al. | |

FOREIGN PATENT DOCUMENTS

| | | |
|---|---|---|
| EP | 1319964 A2 | 6/2003 |
| GB | 2041301 A | 9/1980 |
| GB | 2163114 A | 7/1984 |
| WO | 200173477 A2 | 10/2001 |
| WO | 2007045887 A2 | 4/2007 |
| WO | 2009039488 A1 | 3/2009 |
| WO | 2011106237 A2 | 9/2011 |
| WO | 2012013171 A1 | 2/2012 |
| WO | 2012013962 A1 | 2/2012 |
| WO | 2012085590 A2 | 6/2012 |
| WO | 2013041838 A2 | 3/2013 |
| WO | 2013045669 A1 | 4/2013 |
| WO | 2013076488 A1 | 5/2013 |
| WO | 2013128187 A1 | 6/2013 |
| WO | 2013128188 A1 | 6/2013 |
| WO | 2014096265 A2 | 6/2014 |
| WO | 2014122204 A1 | 8/2014 |
| WO | 2017025738 A1 | 2/2017 |
| WO | 2017064503 A1 | 4/2017 |
| WO | 2017064504 A1 | 4/2017 |
| WO | 2017064505 A1 | 4/2017 |

OTHER PUBLICATIONS

Written Opinion in corresponding International Application No. PCT/EP2012/069144, dated Feb. 4, 2013.
International Search Report in corresponding International Application No. PCT/EP2012/069145, dated Feb. 6, 2013.
Written Opinion in corresponding International Application No. PCT/EP2012/069145, dated Feb. 6, 2013.
Petition for Inter Partes Review of U.S. Pat. No. RE45,268, dated Apr. 27, 2018.
Petition for Inter Partes Review of U.S. Pat. No. 8,879,362, dated Apr. 27, 2018.
Petition for Inter Partes Review of U.S. Pat. No. 8,228,761, dated Apr. 27, 2018.
European Search Report, Ref: PP01726 MP/VR—Application No. 16193961.6-1754, European Patent Office, Germany dated Mar. 15, 2017.
International Preliminary Report on Patentability—PCT/US2018/016879, The International Bureau of WIPO dated Aug. 6, 2019.
http://www.carrack.co.uk/minidobs.htm ("Carrack"), Carrack Measurement Technology, downloaded Jun. 20, 2017.
Cranford, A Direct-Recording Ocean-Bottom Seismograph, Bulletin of the Seismological Society of America, vol. 36, No. 2, 607-615 (Apr. 1976) ("Cranford").
Duey, Rhonda; "Flying Nodes Shift Marine Seismic Paradigm" Dec. 1, 2011; pp. 1-2 [downloaded on Feb. 28, 2012; http://www.epmag.com/item/print/Flying-Nodes-Shift-Marine-Seismic-Paradigm-92689].
Eguchi, A real-time observation network of ocean-bottom-seismometers deployed at the Sagami trough subduction zone, central Japan, Marine Geophysical Researches 20: 73-94, 1998 ("Eguchi").
Holloway et al., "The future of deepwater ocean bottom seismic—Are flying nodes the next big step?", SEG New Odeans Annual Meeting 2015, p. 115-119.
Holloway, "Using Robotic Flying Nodes for Seabed Seismic Data", WS18 D02, 78th EAGE Conference & Exhibition 2016-Workshop Programme, Vienna, Austria, May 30-Jun. 2, 2016.
Hayakudome, Tadahiro; Design of Autonomous Underwater Vehicle, Japan Agency for Marine-Earth Science and Technology (JAMSTEC), Japan International Journal of Advanced Robotic Systems; vol. 8, No. 1 (2011) ISSN 1729-8806; pp. 122-130; [downloaded from http://www.intechopen.com/journals/international_journal_of_advanced_robotic_systems/design-of-autonomous-underwater-vehicle].
Johnson, A Free-Fall Direct-Recording Ocean Bottom Seismograph, Marine Geophysical Researches 3 103-117 (1977) ("Johnson").

(56) References Cited

OTHER PUBLICATIONS

Kirk, A Three-Component Ocean Bottom Seismograph for controlled Source and Earthquake Seismology, Marine Seophysical Researches 5, 1982, 327-341 ("Kirk").

Mattaboni, MITOBs: A Seismometer System for Ocean-Bottom Earthquake Studies, Marine Geophysical Researches 3 (1977), pp. 87-102 ("Mattaboni").

Prothero, First Noise and Teleseismic Recordings on a New Ocean Bottom Seismometer Capsule, Bulletin of the Seismological Society of America, vol. 74, No. 3., 1043-1058 (Jun. 1984) ("Prothero").

Schmalfeldt, Explosion-Generated Seismic Interface Waves in Shallow Water: Experimental Results, SACLANTCEN Report SR-71 (1983) ("Schmalfeldt").

Sutton, Optimum Design of Ocean Bottom Seismometers, Marine Geophysical Researches 9 (1987), pp. 47-65 ("Sutton").

Willoughby, A Microprocessor-Based Ocean-Bottom Seismometer, Bulletin of the Seismological Society of America, vol. 83, No. 1., 190-217 (Feb. 1993) ("Willoughby").

Yoerger et al.; "Fine-Scale Seafloor Survey in Rugged Deep-Ocean Terrain with an Autonomous Robot", Proceedins, ICRA, International Conference on Robotics and Automation, San Francisco, CA, Apr. 2000; ISBN 0-7803-5886-4 pp. 1787-1792.

Yoshida, Hiroshi et al.; "New Attempts in the MR-X1 Sea-Trials: The Working AUV Tries to Survey of the Sea Floor and to Take Mud Samples", Paper No. OMAE-2010-20347; Proceedings of the ASME 2010 29th International Conference on Ocean, Offshore and Arctic Engineering: Jun. 6-11, 2010; Shanghai, China [Downloaded from http://proceedings.asmedigitalcollection.asme.org/ on Nov. 25, 2015].

\* cited by examiner

OCEAN BOTTOM SEISMIC AUTONOMOUS UNDERWATER VEHICLE

PRIORITY

The present application is a continuation of U.S. application Ser. No. 15/888,917, filed on Feb. 5, 2018, which claims priority to U.S. provisional patent application No. 62/455,409, filed on Feb. 6, 2017. The entire contents of each of the above documents is hereby incorporated herein by reference.

FIELD OF THE INVENTION

This invention relates to marine seismology and more particularly relates to the design of ocean bottom seismic autonomous underwater vehicles (AUVs) and the deployment, retrieval, and operation thereof.

DESCRIPTION OF THE RELATED ART

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through a body of water and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

There are many methods to record the reflections from a seismic wave off the geological structures present in the surface beneath the seafloor. In one method, a marine vessel tows an array of seismic data recorders provided in streamers. In another method, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel. The data recorders may be discrete, autonomous units, with no direct connection to other nodes or to the marine vessel, where data is stored and recorded.

Emerging technologies in marine seismic surveys need a fast and cost-effective system for deploying and recovering seismic receivers that are configured to operate underwater, and in particular ocean bottom seismic nodes. Newer technologies use AUVs that have a propulsion system and are programmed to move to desired positions and record seismic data. In general, the basic structure and operation of a seismic AUV is well known to those of ordinary skill. For example, Applicant's U.S. Pat. No. 9,090,319, incorporated herein by reference, discloses one type of autonomous underwater vehicle for marine seismic surveys. As another example, Applicant's U.S. Patent Publication No. 2017/0137098, incorporated herein by reference, discloses another type of AUV for seabed seismic applications.

Because a seismic survey may require hundreds if not thousands of AUVs for a particular survey, an AUV is needed that is easy to operate and relatively straightforward and cost-effective to manufacture. However, existing technologies for deploying a seismic AUV to the ocean bottom (and the related AUV designs) are not cost effective and present many operational problems. A need exists for an improved AUV that is more cost effective and less complex, one that is lighter and requires less power, and one that is easier to maintain and repair. An improved AUV is needed that more effectively couples to the seabed and can travel to and from a particular point on the seabed without using as much power as may be required by known seismic AUVs.

SUMMARY OF THE INVENTION

Seismic autonomous underwater vehicles (AUVs) for recording seismic signals on the seabed. The AUV may be negatively buoyant and comprise an external body (which may be formed of multiple housings) that substantially encloses a plurality of pressure housings. Portions of the external body housing may be acoustically transparent and house one or more acoustic devices for the AUV. The AUV may comprise a main pressure housing that holds substantially all of the electronic components of the AUV, while a second and third pressure housing may be located on either side of the main pressure housing for other electronic components (such as batteries). A plurality of external devices (such as acoustic devices or thrusters) may be coupled to the main pressure housing by external electrical conduit. The AUV may comprise fixed or retractable wings for increased gliding capabilities during subsea travel.

In one embodiment, disclosed in an autonomous underwater vehicle (AUV) for recording seismic signals on the ocean bottom during a marine seismic survey. The AUV may comprise a propulsion system configured to propel and steer the AUV while travelling underwater, one or more seismic sensors configured to record seismic signals while the AUV is resting on the bottom of the ocean, and a plurality of pressure vessels each housing a plurality of electronic components. The AUV may be negatively buoyant in sea water, such as approximately 5 kg.

The plurality of pressure vessels of the AUV may comprise a main pressure housing that comprises the core electronic components of the AUV, such as one or more of the following: a digital autonomous recorder (DAR), one or more seismic sensors, and a clock. The plurality of pressure vessels may further comprise first and second pressure housings that comprises a first and second plurality of battery cells, respectively. The first and second pressure housings of the AUV may have substantially the same shape and weight, and the main pressure housing may be arranged substantially in the middle of the AUV while the first and second pressure housings may be arranged on either side of the main pressure housing. Each of the plurality of pressure vessels may be cylindrical. Each of the plurality of pressure vessels may be electrically coupled to each other by one or more external conduits. A plurality of acoustic devices (such as hydrophones, modems, transducers, transponders, etc.) may be coupled to the main pressure housing by an external connection, such as underwater cable or rigid conduit that houses one or more electrical wires.

The AUV may further comprise a body coupled to the plurality of pressure vessels, wherein the body comprises an upper section that is positively buoyant, a lower section that is configured to couple with the seabed, and a front section that is acoustically transparent. Each of the upper section, lower section, and front sections may be separate components of the body that are configured to couple together. The lower section of the body may be substantially flat. The body may substantially enclose the plurality of pressure vessels. For example, a plurality of acoustic devices may be enclosed within the front section of the body. The plurality of pressure vessels and propulsion system may be configured to be assembled together prior to assembly of the body. The propulsion system may comprise a combination of front and rear propulsion components, such as one or more front vertical thrusters, one or more (e.g., two) rear horizontal thrusters, and one or more rear vertical thrusters. The thrusters may also be located on the top, side, or bottom portions of the AUV in other arrangements. The AUV may further comprise a plurality of retractable wings.

In one embodiment, disclosed is a method for performing a marine seismic survey, comprising deploying an autonomous underwater vehicle (AUV) to the bottom of the ocean, recording seismic signals by the one or more seismic sensors while on the seabed, and lifting the AUV off of the seabed by activating a propulsion system on the AUV. The AUV may be negatively buoyant. Similar to the AUV described above, the AUV may further comprise one or more seismic sensors configured to record seismic signals while the AUV is resting on the bottom of the ocean, a propulsion system configured to propel and steer the AUV while travelling underwater, and a plurality of pressure vessels, each housing a plurality of electronic components. The method may further comprise extending a plurality of retractable wings on the AUV during subsea travel. The method may further comprise retracting a plurality of retractable wings on the AUV during storage or seabed recording. The method may further comprise turning off the propulsion system during subsea travel while a plurality of wings on the AUV are extended.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Autonomous Underwater Vehicles and Components Thereof

In one or more embodiments, an autonomous underwater vehicle (AUV) is used to record seismic signals on or near the seabed. A seismic AUV in the following description is considered to encompass an autonomous self-propelled underwater node that has one or more sensors capable of detecting seismic waves in a marine environment. The following embodiments are discussed, for simplicity, with regard to the terminology and structure of an AUV with seismic sensors for recording seismic waves. In general, the structure and operation of a seismic AUV is well known to those of ordinary skill. For example, Applicant's U.S. Pat. No. 9,090,319, incorporated herein by reference, discloses one type of autonomous underwater vehicle for marine seismic surveys.

Figure 1:
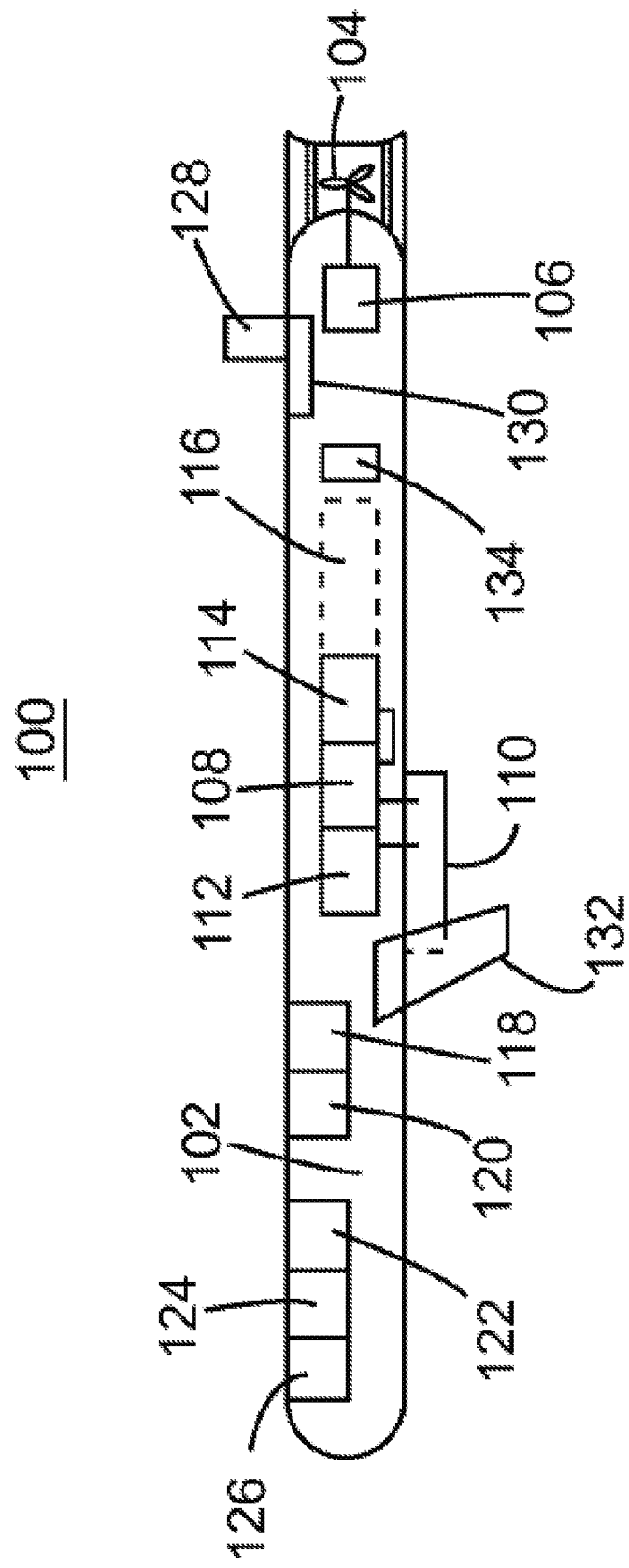
FIG. 1 illustrates one embodiment of a schematic diagram of an AUV.

FIG. 1 is reproduced from FIG. 5 of Applicant's U.S. Pat. No. 9,090,319. The disclosed embodiment may use one or more systems, components, and/or features from the AUV described in FIG. 1. FIG. 1 illustrates one embodiment of AUV 100 having a body 102 in which a propulsion system may be located. The propulsion system may include one or more propellers 104 and a motor 106 for activating the propeller 104. Other propulsion systems may be used, such as jets, thrusters, pumps, etc. Further, the propellers (or other propulsion systems) may be located at various parts of the AUV, such as front, sides, or the top or bottom of the AUV, such as that disclosed in U.S. Patent Publication No. 2017/0137098, incorporated herein by reference. Alternatively, the propulsion system may include adjustable wings 132 for controlling a trajectory of the AUV. Motor 106 may be controlled by a processor/controller 108. Processor 108 may also be connected to one or more seismic sensors 110. Seismic sensor 110 may have a shape such that when the AUV lands on the seabed, the seismic sensor achieves a good coupling with the seabed sediment. The seismic sensor may include one or more of a hydrophone, geophone, accelerometer, etc. For example, if a 4C (four component) survey is desired, the seismic sensors may include three accelerometers and a hydrophone, i.e., a total of four sensors. Alternatively, the seismic sensor may include three geophones and a hydrophone. Of course, other sensor combinations are possible, and may include one or more of a hydrophone, geophone, accelerometer, electromagnetic sensor, depth sensor, MEMs, or a combination thereof. Seismic sensor 110 may be located completely or partially inside body 102. A memory unit 112 may be connected to processor 108 and/or seismic sensor 110 for storing seismic data recorded by seismic sensor 110. Power system 114 (such as one or more batteries) may be used to power all these components. Battery 114 may be allowed to shift its position along a track 116 to change the AUV's center of gravity. This shift may be controlled by processor 108. The AUV may also include a clock and digital data recorder (not shown).

In one embodiment, the AUV may also include an inertial navigation system (INS) 118 configured to guide the AUV within a body of water and to a desired location. An inertial navigation system may include a module containing accelerometers, gyroscopes, magnetometers, or other motion-sensing devices. The INS may initially be provided with the current position and velocity of the AUV from another source, for example, a human operator, a GPS satellite receiver, a deployed subsea station, a deployed ROV, another AUV, from one or more surface vessels, etc., and thereafter, the INS computes its own updated position and velocity by integrating (and optionally filtrating) information received from its motion sensors. One advantage of an INS is that it requires no external references in order to determine its position, orientation or velocity once it has been initialized. However, the INS may still require regular or periodic updates from an external reference to update the AUV's position to decrease the positioning error of the AUV, particularly after long periods of time subsea. As noted above, alternative systems may be used, as, for example, acoustic positioning. An optional acoustic Doppler Velocity Log (DVL) (not shown) can also be employed as part of the AUV, which provides bottom-tracking capabilities for the AUV. Sound waves bouncing off the seabed can be used to determine the velocity vector of the AUV, and combined with a position fix, compass heading, and data from various sensors on the AUV, the position of the AUV can be determined. This assists in the navigation of the AUV, provides confirmation of its position relative to the seabed, and increases the accuracy of the AUV position in the body of water. In other embodiments, and to reduce the complexity of the AUV, an INS may not be utilized.

Besides or instead of INS 118, the AUV may include compass 120 and other sensors 122 as, for example, an altimeter for measuring its altitude, a pressure gauge, an interrogator module, etc. The AUV 100 may optionally include an obstacle avoidance system 124 and a communication device 126 (e.g., Wi-Fi or other wireless interface, such as a device that uses an acoustic link) or other data transfer device capable of wirelessly transferring seismic data and/or control status data. One or more of these elements may be linked to processor 108. The AUV further includes antenna 128 (which may be flush with or protrude from the AUV's body) and corresponding acoustic system 130 for subsea communications, such as communicating with a deployed ROV (or other underwater station), another AUV, or a surface vessel or station. For surface communications (e.g., while the AUV is on a ship), one or more of antenna 128 and communication device 126 may be used to transfer data to and from the AUV. The AUV may include buoyancy system 134 for controlling the AUV's depth and keeping the AUV steady after landing.

Stabilizing fins and/or wings 132 for guiding the AUV to the desired position may be used with the propulsion system for steering and/or gliding of the AUV. The wings may be fixed or retractable. While fixed wings are less complex, in prior art AUVs, fixed wings traditionally are fragile and likely to break during handling and/or storage, and prevent effective coupling on the seabed with the AUV. A retractable wing provides numerous benefits. For example, the wings may be in a retracted position when the AUV is on the back deck of the deployment vessel (or otherwise in storage) as well as while resting on the seabed. The wings may be extended while the AUV is traveling subsea, such as during travel from the surface to the seabed (e.g., during AUV deployment) or from the seabed to a recovery station or surface vessel (e.g., during AUV recovery). The wings may be used to improve the gliding ratio of the AUV, which may be useful to decrease the power needed for the propulsion system. In some embodiments, the propulsion system (e.g., thrusters) may be periodically turned off during subsea travel (e.g., to prevent acoustic noise or to conserve power) and the AUV still be able to navigate in the water based on the wings. In one embodiment, the AUV may stay substantially neutral in the water based on the positive buoyancy provided to the AUV by the wings. The wings may be fully or partially retracted into the AUV. In one embodiment, the wings are hinged at a certain distance along the wing and the wing fold back towards the main body of the AUV as necessary, either horizontally or vertically. In other embodiments, a substantial portion of the wing folds back into the external body housing of the AUV such that the exterior of the AUV is substantially flush. However, in one embodiment, the AUV has no fins or wings.

Acoustic system 130 may be an Ultra-Short Baseline (USBL) system, also sometimes known as Super Short Base Line (SSBL). This system uses a method of underwater acoustic positioning. A complete USBL system may include a transceiver or acoustic positioning system mounted on a pole under a vessel or ROV (such as Hi-PAP or µPAP, commercially available by Kongsberg) and a transponder on the AUV. In general, a hydro-acoustic positioning system consists of both a transmitter and a receiver, and any Hi-PAP or µPAP or transponder system acts as both a transmitter and a receiver. An acoustic positioning system uses any combination of communications principles for measurements and calculations, such as SSBL. In one embodiment, the acoustic positioning system transceiver comprises a spherical transducer with hundreds of individual transducer elements. A signal (pulse) is sent from the transducer (such as a Hi-PAP or µPAP head on the surface vessel), and is aimed towards the seabed transponder located on the AUV. This pulse activates the transponder on the AUV, which responds to the vessel transducer after a short time delay. The transducer detects this return pulse and, with corresponding electronics, calculates an accurate position of the transponder (AUV) relative to the vessel based on the ranges and bearing measured by the transceiver. In one embodiment, to calculate a subsea position, the USBL system measures the horizontal and vertical angles together with the range to the transponder (located in the AUV) to calculate a 3D position projection of the AUV relative to a separate station, basket, ROV, or vessel. An error in the angle measurement causes the position error to be a function of the range to the transponder, so an USBL system has an accuracy error increasing with the range. Alternatively, a Short Base Line (SBL) system, an inverted short baseline (iSBL) system, or an inverted USBL (iUSBL) system may be used, the technology of which is known in the art. For example, in an iUSBL system, the transceiver is mounted on or inside the AUV while the transponder/responder is mounted on a separate vessel/station and the AUV has knowledge of its individual position rather than relying on such position from a surface vessel (as is the case in a typical USBL system). In another embodiment, a long baseline (LBL) acoustic positioning system may be used. In a LBL system, reference beacons or transponders are mounted on the seabed around a perimeter of a work site as reference points for navigation. The LBL system may use an USBL system to obtain precise locations of these seabed reference points. Thus, in one embodiment, the reference beacon may comprise both an USBL transponder and a LBL transceiver. The LBL system results in very high positioning accuracy and position stability that is independent of water depth, and each AUV can have its position further determined by the LBL system. The acoustic positioning system may also use an acoustic protocol that utilizes wideband Direct Sequence Spread Spectrum (DSSS) signals. In one embodiment, the AUV is equipped with a plurality of communication devices, such as an USBL beacon capable of receiving and transmitting acoustic signals, a phased array receiver (or system) that is able to determine the direction of an incoming acoustic signal by analysis of the signal phase, and an acoustic modem.

With regard to the AUV's internal configuration, the AUV includes a CPU that may be connected to an inertial navigation system (INS) (or compass or altitude sensor and acoustic transmitter for receiving acoustic guidance from the mother vessel), a wireless interface, a pressure gauge, and an acoustic transponder. The INS is advantageous when the AUV's trajectory has been changed, for example, because of an encounter with an unexpected object (e.g., fish, debris, etc.), because the INS is capable of taking the AUV to the desired final position as it encounters currents, wave motion, etc. Also, the INS may have high precision. For example, an INS may be accurate up to 0.1% of the travelled distance, and a USBL system may be accurate up to 0.06% of the slant range. Thus, it is expected that for a target having a depth of 1000 m, the INS and/or the acoustic guidance is capable of steering the AUV within +/−1 m of the desired target location. The INS may be also configured to receive data from a surface vessel and/or a deployed ROV to increase its accuracy. The AUV may include multiple CPUs. For example, a second CPU may be configured to control one or more attitude actuators and a propulsion system. One or more batteries may be located in the AUV. A seismic payload is located inside the AUV for recording the seismic signals. As another embodiment, an obstacle avoidance system may be included in the AUV, which is generally configured to detect an object in the path of the AUV and divert the AUV from its original route to avoid contact with the object. In one example, the obstacle avoidance system includes a forward-looking sonar. The AUV includes any necessary control circuitry and software for associated components. In one embodiment, the AUV may have various operational modes, such as wakeup, sleep, maintenance, and travel modes.

Those skilled in the art would appreciate that more or less modules may be added to or removed from the AUV. For example, the AUV may include variable buoyancy functionality, such as the ability to release a degradable weight on the bottom of the ocean after seismic recording to assist in the rise or surfacing of the AUV to a recovery spot (such as on or near the ocean surface). In other embodiments, the AUV may include one or more buoyancy or ballast tanks that may be flooded with air or water to assist in the vertical navigation of the AUV, such as described in more detail in Applicant's U.S. Patent Publication No. 2015/0336645, incorporated herein by reference. In another embodiment, the AUV may include a suction skirt that allows water to be pumped out of a compartment under the AUV after it has landed to create a suction effect towards the seabed. In still other embodiments, the AUV may include one or more seabed coupling mechanisms or self-burying functionality, such as the ability to rock or twist into the ocean by specific movements of the AUV or the use of a plurality of water outlets on the bottom of the AUV to fluidize the seabed sediment, as described in more detail in Applicant's U.S. Pat. Nos. 9,381,986 and 9,457,879, incorporated herein by reference.

In one embodiment, the AUV requires minimal acoustic devices, which decreases the overall cost of the AUV and guidance/deployment protocols during deployment and retrieval of the AUVs to and from the seabed. For example, for acoustic communications each AUV may only comprise a USBL beacon and a phased array system, such as but not limited to a Sonardyne beacon and an Arkeocean phase array system. In one embodiment, the phase array system may comprise a Combined Acoustic Phased Array (CAPA) and a Triton processing board. In one embodiment, the phased array is configured to intercept and/or receive the acoustic signals emitted by other seismic AUVs (such as previously landed seismic AUVs) and to guide the AUV to the seabed based on those received acoustic signals.

AUV Design

The disclosed AUV embodiments provides numerous benefits over previously disclosed seismic AUVs, including better seabed seismic coupling, enhanced subsea maneuverability, control, and propulsion, and increased acoustic capabilities. The disclosed AUV uses less power than conventional seismic AUVs, and is also more cost effective, lighter, less complex, more reliable, and easier to handle and repair than existing seismic AUVs. The AUV may be configured to travel to at least 3000 meters beneath the surface of a body of water and record seismic signals at the bottom of the seabed with one or more seismic sensors.

Figure 2A:
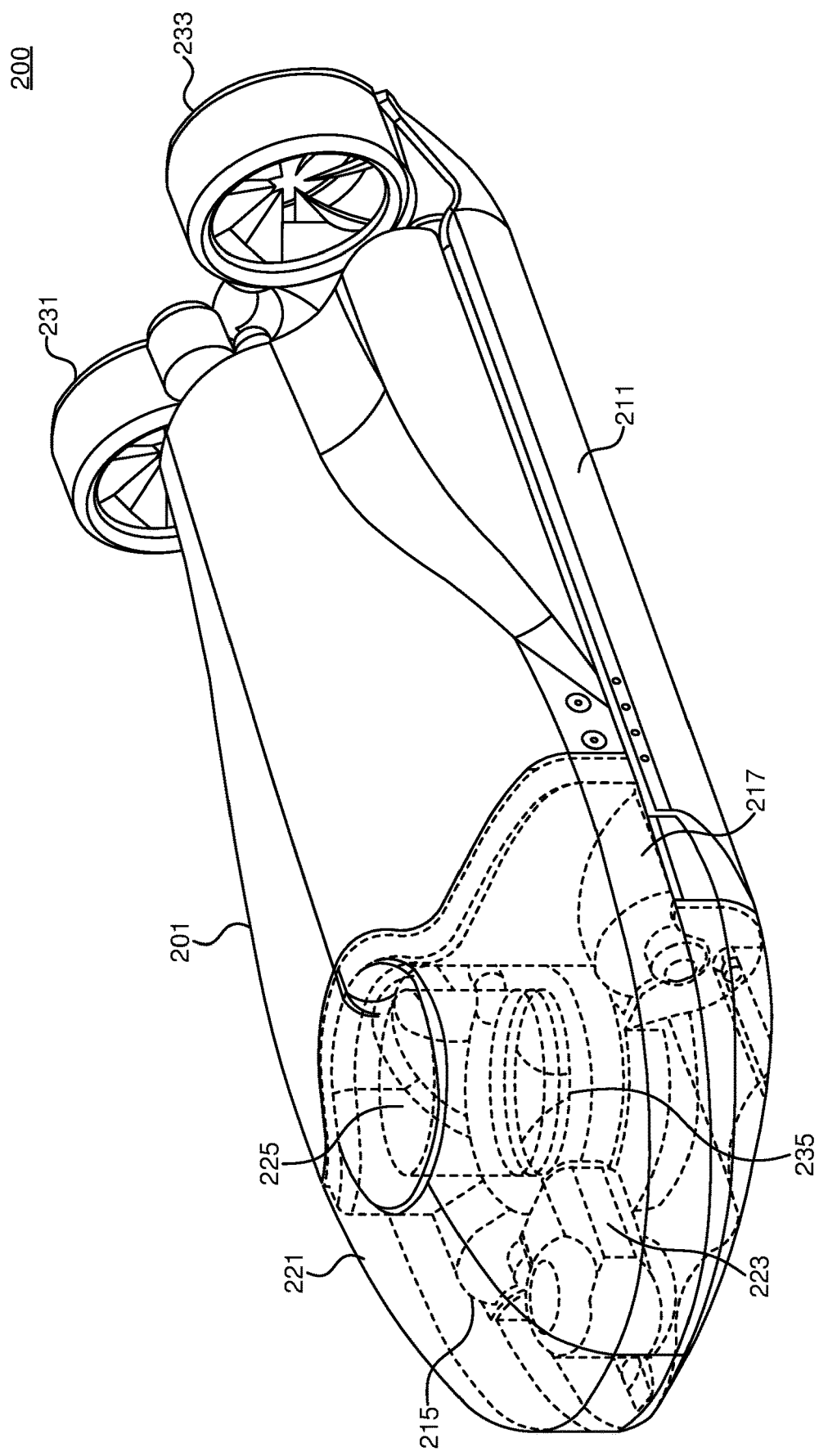
FIGS. 2A-2D illustrate various views of a seismic AUV according to one embodiment of the present disclosure.
Figure 2D:
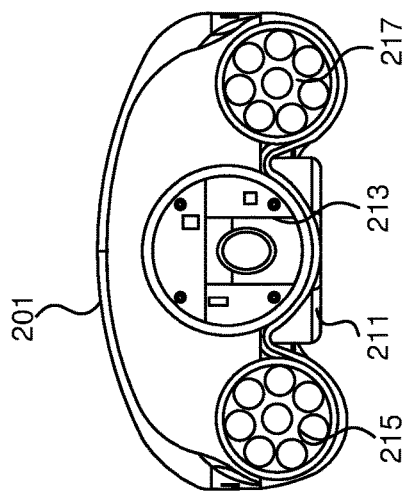
Figure 2B:
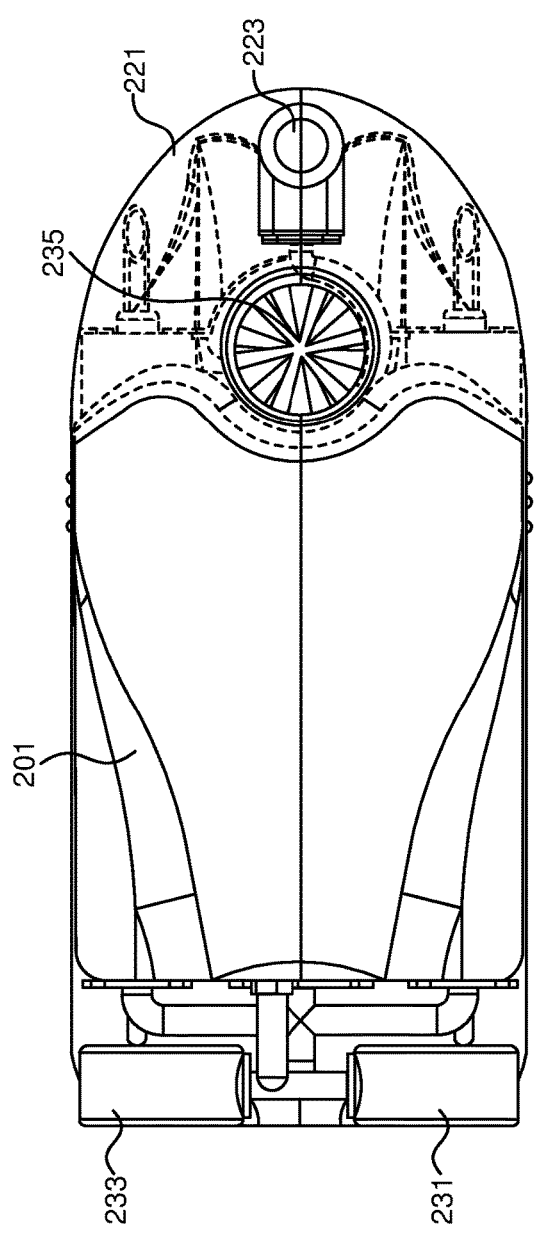
Figure 2C:
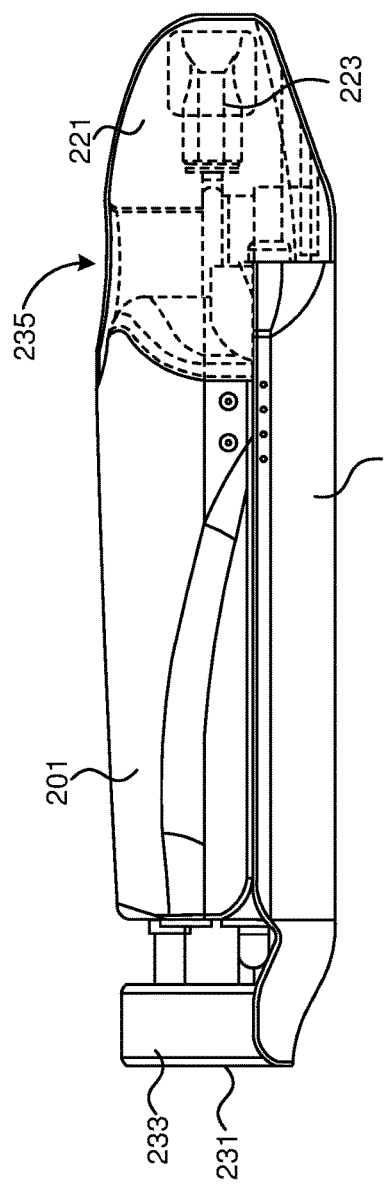

FIGS. 2A-2D illustrate various views of an AUV according to one embodiment of the present disclosure. FIG. 2A illustrates a perspective view, FIG. 2B illustrates a top view, FIG. 2C illustrates a side view, and FIG. 2D illustrates a front view of AUV 200. In one embodiment, the AUV comprises a plurality of internal components surrounded by a plurality of modular casings that couple together to form the body of the AUV. In other words, once assembled, the individual casings or shells form an external body to provide the overall shape of the AUV. For example, as shown in FIGS. 2A-2D, the disclosed AUV comprises buoyant body 201, lower shell or casing 211, head casing/cover 221, one or more pressure housings, and a propulsion system.

Buoyant body 201 may be designed to ensure proper hydrodynamics of the AUV in a body of water and the required buoyancy of the AUV. In one embodiment, the buoyant body forms an upper shell of the AUV that removably couples to head casing 221, lower shell 211, and/or one or more of the pressure housings. In one embodiment, body 201 is comprised of a positively buoyant flotation material that partially offsets the remaining negative buoyant components of the AUV, thereby making the overall buoyancy of the AUV slightly negative. In other words, while the AUV main body is positively buoyant, the remaining components (e.g., the pressure vessels, wings, and other attached components) are negatively buoyant such that the overall buoyancy of the AUV is slightly negative. In one embodiment, the overall vehicle weight is approximately 5 kg in sea water. In contrast, conventional AUVs have a substantially neutral water buoyancy, which makes coupling to the seabed potentially problematic for prior art seismic AUVs.

The flotation material may be made of a material with a plurality of air cells or pockets. In one embodiment, the floatation material is made out of microsphere syntactic foam, which is comprised of resin and hollow glass microspheres. The syntactic foam is available in a range of densities and is formulated to meet depth and buoyancy requirements down to 10,000 meters. The syntactic foam may be fully casted and/or machined to the specific configurations of the AUV body shape and thereafter coated with one or more layers of protective skins for improved impact resistance, reduced water absorption, and reduced drag in the water. The protective coating may also have anti-fouling properties to prevent or slow down any undesired marine biological growth. Among other benefits, the syntactic foam has high compressive strength, high buoyancy per kilogram, and low water absorption. In other embodiments, the floatation material may also be casted in a pre-made polyethylene (PE) coated or similar plastic coating rotation mold. In one embodiment, the buoyant body of the AUV is cast as a single foam structure. Various other embodiments of buoyant body 201 are possible. In one embodiment, the buoyancy of the AUV is approximately 10 kg while the total weight is approximately 15 kg, and thus the overall buoyancy in sea water is approximately 4-5 kg.

In one embodiment, the overall AUV shape is designed to provide lift during the motion of the AUV itself in a body of water. Much like an airplane, the lift force depends on the AUV velocity, the attack angle of the AUV, and the hydrodynamic shape of the AUV. In one embodiment, the bottom of the AUV (such as lower casing 211) is substantially flat. In one embodiment, lower casing 211 is made of a plastic or similar PE type material.

One or more pressure housings or vessels may incorporate all or substantially all of the electronic components, sensors, and batteries of the AUV, each which may be water tight and pressure resistant at water depths found at the seabed. In one embodiment, the AUV comprises avionics, a seismic payload, a power supply system, and a propulsion system. In one embodiment, there may be three cylindrical pressure housings, as shown in FIG. 2D. For example, a primary (or main) pressure housing 213 may house all of the AUV electronics and seismic sensors and be located substantially in the center of the AUV. Pressure housing 213 may be substantially in the shape of a cylinder. The AUV may also have additional pressure housings on either side of main pressure housing 213. For example, second cylindrical body 215 may house a first plurality of battery cells or battery packs and third cylindrical body 217 may house a second plurality of battery cells or battery packs. In one embodiment, each of the three housings 213, 215, 217 is made of aluminum. The primary housing 213 may comprise the avionics and the acoustic devices of the AUV, while the secondary housings 215, 217 comprise the power system (e.g., batteries) of the AUV. Second and third housings 215, 217 may be substantially the same size, shape, and weight.

The use of a two or three pressure housing assembly for a seismic AUV (which is enclosed within a separate casing/body) is different than that disclosed in the prior art. In the prior art, an AUV may typically have a single waterproof case in which all of the electronic components are situated and enclosed within. On the other hand, other prior art seismic AUVs may only have a single pressure housing in which substantially all of the electronic components are enclosed within. Increasing the number of separate pressure housings for an AUV provides various benefits, but increases the problems for AUV seabed coupling, maneuverability in water, overall AUV design, and increased watertight connections between the different electronic components.

In one embodiment, a first battery pack is utilized for propulsion of the AUV (such as for propulsion to and from the seabed) and a second battery pack is utilized for the electronic boards of the AUV (such as during seismic recording on the seabed). In one embodiment, each of the pressure housings couples to the seabed for seismic recording purposes. In another embodiment, only the bottom portion of each of the battery pack cylindrical housings 215, 217 couples to the seabed. In still another embodiment, substantially all of lower case 211 couples to the seabed.

The AUV may have a portion of the external casing located at the head, such as head casing 221. Head casing 221 may be located at the substantially front end of the AUV and be coupled to buoyant body 201, lower case 211, and/or one or more of the pressure housings. In one embodiment, head casing 221 may hold or enclose one or more acoustic devices 223, such as a hydrophone or transducer or phased array receiver, etc., and thus may be considered an acoustic head casing. In one embodiment, acoustic device 223 may comprise a phase array head and/or transducer.

The AUV has a propulsion system that is configured to propel and/or steer the AUV in a body of water. The propulsion system may comprise a plurality of thrusters at different portions of the AUV. For example, the propulsion system may comprise one or more thrusters, such as one or more vertical thrusters 235 located towards a front portion of the AUV and one or more horizontal thrusters 231, 233 located near the rear portion of the AUV. More or less thrusters are possible. The thrusters may be integrated within various portions of the body or coupled to an external portion of the AUV body. For example, rear thrusters 231, 233 may be located external to body 201, and vertical thruster 235 may be located within head casing 221 or body 201. In one embodiment, head casing 221 comprises hole or opening 225 in which thruster 235 may be positioned, as shown in FIGS. 2A and 2B. While not illustrated in FIGS. 2A-2D, the AUV may have a plurality of fixed or retractable wings that may extend out from the AUV body. They may be attached to the external body of the AUV or may be attached to one or more of the pressure housings within the external body. Such retractable wings are discussed in more detail above.

Figure 3:
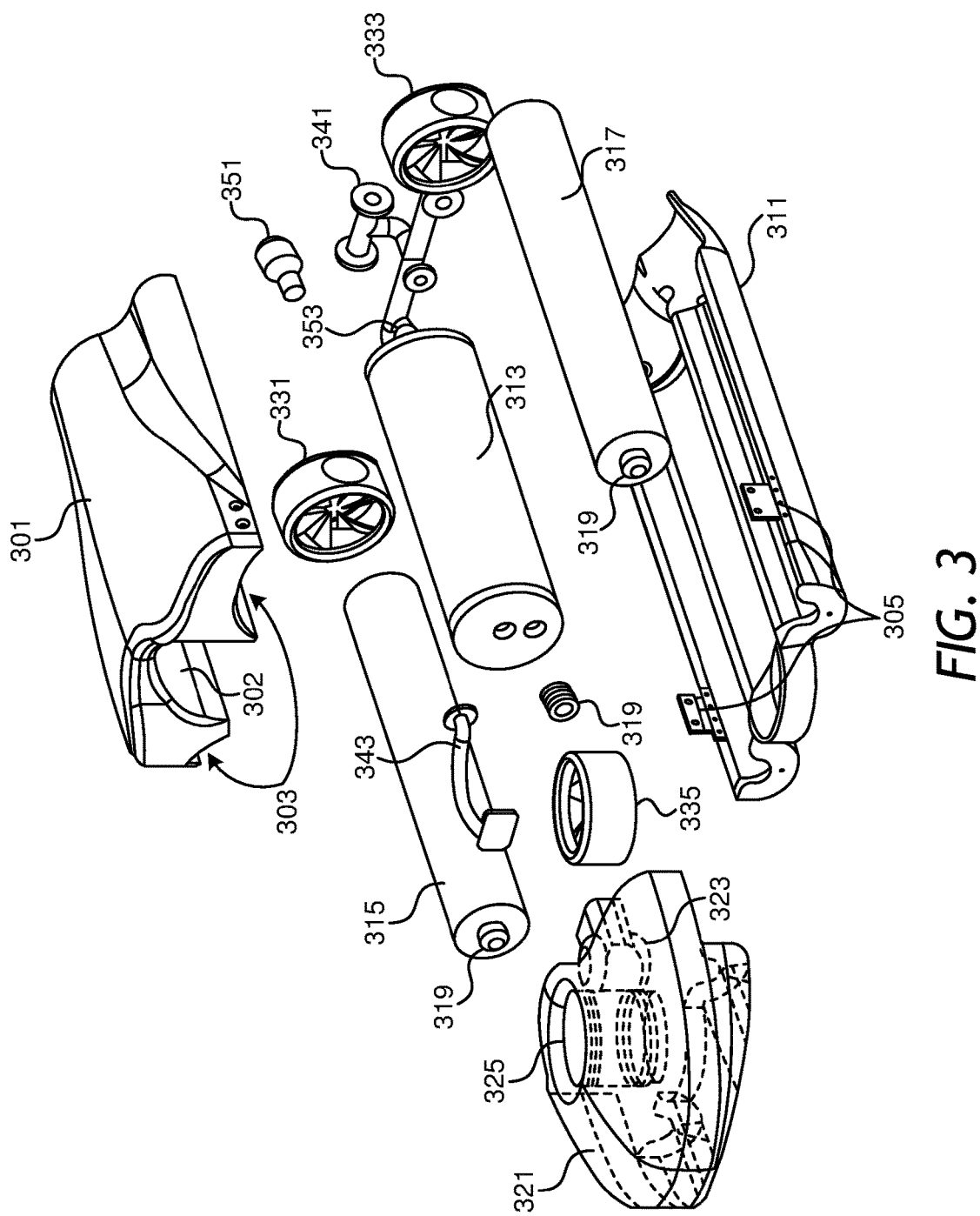
FIG. 3 illustrates an exploded view of the seismic AUV from FIGS. 2A-2D.

FIG. 3 illustrates one embodiment of an AUV with each of the components shown in an exploded or non-assembled view. The seismic AUV and components thereof described in FIG. 3 may be substantially similar to that described in FIGS. 2A-2D.

Seismic AUV 300 may comprise a first upper section 301 that is substantially buoyant (such as being made of syntactic foam) and a second lower section 311 that is not as buoyant as the upper section (such as being made of plastic). In this embodiment, the upper section may be removably attached to the lower section via fasteners 305 to form a non-water tight housing or enclosure around the pressure housings. The upper and lower sections 301, 311 are designed (among other things) to provide lift to the AUV in a body of water during horizontal movement, achieve good coupling between the AUV and the seabed, and provide protection to the internal components of the AUV. Together, upper section 301, lower section 311, and head section 321 form the body of the AUV and provide the overall shape of the AUV. In one embodiment, all of the pressure housings and external electronic components are assembled together, and the upper and lower sections 301, 311 of the body are simply fastened around the electronic components of the AUV. In one embodiment, body 301 may be shaped to receive one or more of the pressure housings within an internal compartment or recess of the body. For example, recess 302 may be located within a substantially central portion of body 301 and be configured to receive the main or first pressure housing 313. Recesses 303 may be located on body 301 on either side of recess 302 and be configured to each receive the second and third pressure housings 315, 317. Similarly, lower casing 311 may comprise corresponding recesses to receive each of the pressure housings.

The seismic AUV may comprise a plurality of water-tight pressure housings, each of which may be cylindrical in shape, to hold various electronic components of the AUV. For example, main pressure housing 313 may house all of the AUV electronics (e.g., avionics, control boards, digital data recorder (DAR)) and seismic sensors (e.g., hydrophone and/or geophones), first battery housing 315 may house a first plurality of battery cells or battery packs, and second battery housing 317 may house a second plurality of battery cells or battery packs. Each pressure housing may be made of aluminum and electrically interconnected by cables or tubes (as described in more detail herein). In one embodiment each housing 315, 317 may have the same number of battery cells with the same weight such that the cylindrical housings have substantially the same weight and size. In one embodiment, the battery packs between the housings 315, 317 may be different. For example, the battery cells in one of the housings may be configured to provide power during the navigation phase of the AUV, which may be configured to provide a large current for a short duration (such as 30 minutes). The battery cells in the other pressure housing maybe configured to provide power during the seismic recording phase, which may be configured to provide a small current for a long duration (such as 70 days). In one example, battery housing 315 may be coupled to and/or configured to power the propulsion system, the navigation system, and the main control board, and battery housing 317 may be coupled to and/or configured to power the seismic payload and any acoustic devices. Each pressure housing may have a pressure relief valve 319.

One problem with conventional seismic AUVs and sensors is the use of external cables, wires, and/or connectors outside of any pressurized vessel. Each electrical component (e.g., motor, sensor, battery, antenna, propeller, etc.) requires an electrical connection. Harsh conditions (such as extreme pressures and temperatures existing at or near the seabed, along with corrosion issues caused by seawater) cause many problems with electrical connections and components exposed to the sea, often times leading them to fail and/or have a shortened life. While it is desired to reduce the number of electrical components and connections outside of a pressure vessel, existing designs of seismic AUVs have not been able to solve this problem. Thus, in one embodiment, the disclosed AUV eliminates all or substantially all of the electrical cables and connectors outside of the pressure vessel by using direct connections of external components to the pressure housing and by using rigid tubing between electronic components that houses any electronic wires.

In one embodiment, main pressure housing 313 is electrically coupled to first and second battery housings 315, 317 via rigid tubing 341. The rigid tubing may comprise electrical connectors or wires within the tubing that connects the electronic components between the different housings. A pressure and water resistant connection exists between the rigid tubing and the pressure housing, and such a connection may be a variety of known connections. The use of rigid tubing prevents damage to the electrical connections and wires and offers increased water and pressure resistance at great seabed depths. For example, the metallic tubing may allow electrical wire to pass through air sealed within the tubing. In one embodiment, rigid tubing 341 acts as a manifold to connect different electronic components and housings to the main pressure housing. In addition, different components may be attached to the main pressure housing via rigid tubing. For example, acoustic device 323 may be coupled to main pressure housing 313 via rigid tubing 343. Likewise, any of the thrusters (or other external devices) may be attached to the main pressure housing via a rigid electrical coupling. For example, rear horizontal thrusters 331, 333 may also be coupled to a portion of rigid coupling 341, and front thruster 335 may similarly be connected to the main pressure housing via an additional rigid conduit.

In one embodiment, seismic AUV comprises plug connector 351 (for charging and/or downloading with an external device) and hydrophone 353, each of which is mounted in an end of main pressure housing 313. This eliminates the need for any external wiring between these components and the pressure housing. In one embodiment, hydrophone 353 and connector 351 may be coupled to the pressure housing by a pressure sealed connector or penetrator or even flat surface electrical connection.

In one embodiment, the propulsion system of seismic AUV 300 may comprise a plurality of thrusters, and in one embodiment may include one vertical thruster 335 located in a front portion of the AUV and two horizontal thrusters 331, 333 located substantially in a rear portion of the AUV. In other embodiments the AUV may comprise a plurality of vertical thrusters, and in still other embodiments the horizontal thrusters may be located near the middle of the AUV (such as on the top, bottom, or side of the AUV) of the rear portion of the AUV. As is known in the art, the thrusters may be propellers, impellers, and/or jet nozzles. Each thruster may be coupled to a motor or water pump that is powered by a power supply. Each thruster may be selectively and independently operated and controlled, such that for any particular movement and/or operation, one, two, or three of the thrusters may be simultaneously operated. The thrusters are configured to rotate in opposing directions as appropriate. For example, the vertical thruster may rotate in a first direction to provide positive vertical lift (e.g., move the nose of the AUV up) and may be configured to rotate in a second direction to provide negative vertical lift (e.g., move the nose of the AUV down). Similarly, the horizontal thrusters may be configured to rotate in a first direction to provide forward movement and in a second direction to provide backwards movement. Each of the horizontal thrusters may be configured to operate in counter-rotating propeller mode (e.g., rotate in separate directions and still provide the same lateral movement) for increased AUV flight stability, such that the angular momentum and/or torque developed by the propellers is balanced and/or cancelled out. In one embodiment, the thrusters are any commercially available thrusters configured to create a certain amount of thrust in a given direction in a body of water. In other embodiments, the thrusters are specially designed thrusters for optimal weight, design, and speed, size, and thrust considerations. In one embodiment, the AUV uses rim driven thrusters. Rim driven thrusters significantly prevent the risk of a rope, cable, or similar deployment line from being trapped in the propeller of the thruster. In a rim driven thruster, the center of the propeller is "open" with the propellers or fins being rotated by the rim or outer periphery of thruster driving the propellers, such that a rope can pass through without catching. The RIM thruster may comprise an electric torque motor with drives the inside propeller. In one embodiment, the thrusters can be connected to the pressure housings (and internal electronics thereof) by pressured sealed connectors or penetrators.

Seismic AUV 300 may comprise acoustic head or cover 321, which is configured to provide acoustic transparencies to any acoustic signals to and from the AUV. In one embodiment, acoustic transparent cover 321 is fastened to upper and/or lower body sections 301, 311. Acoustic head cover 321 may comprise hole or opening 325 that is configured to receive vertical thruster 335. In one embodiment, head casing 321 protects and/or houses one or more acoustic device 323. Acoustic device 323 may be an acoustic modem, a phase array receiver, and/or a transducer. Acoustic device 323 may be coupled to main pressure housing 313 by a cableless connector and/or penetrator (such as rigid conduit 343).

Figure 4:
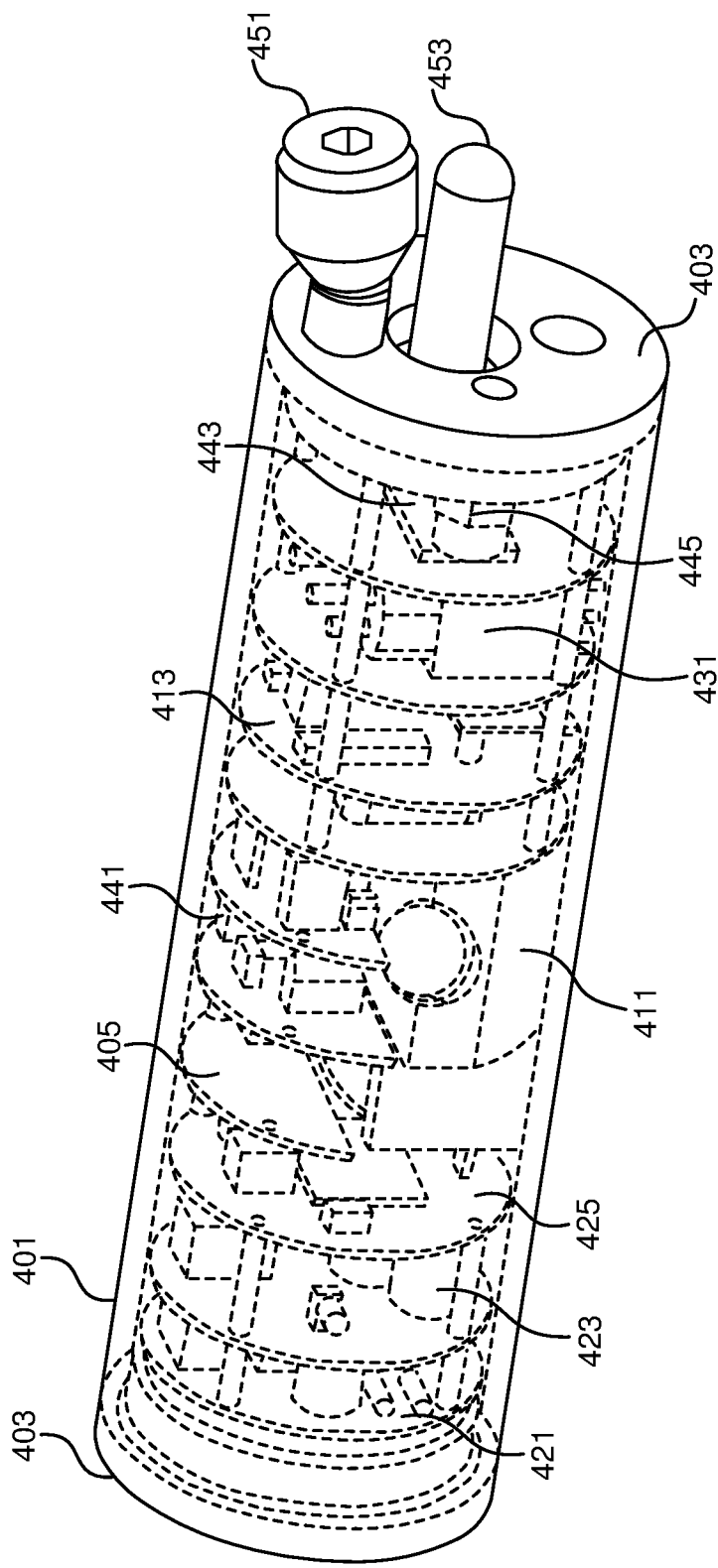
FIG. 4 illustrates one example of a main pressure housing of a seismic AUV according to one embodiment of the present disclosure.

FIG. 4 illustrates an example of the main pressure housing of the seismic AUV, such as main pressure housing 313 from FIG. 3. The main pressure housing functions as the electronics board chassis for the AUV. In one embodiment, main pressure housing 400 is substantially cylindrical and may be comprised of a single cylindrical housing 401 with two endcaps 403, which may be flat or hemispherical. The pressure vessel is capable of withstanding pressure depths of 3000 meters or more beneath the water surface. In contrast to prior art AUV designs, this cylindrical design provides a cost-effective configuration for the main pressure housing; however, such a uniform shape to the pressure vessel creates additional problems, such as electrically connecting many of the operational components that are needed for an AUV (such as propellers, sensors, acoustic devices, etc.). Pressure vessel 400 may be made of carbon fiber, titanium, aluminum or other material.

In one embodiment, main pressure housing 400 comprises all or substantially all of the electronic components of the AUV, including low level control board 441, CPU board 443, Sonardyne beacon 421, Triton acoustic board 423, communications board 425 (such as a WiFi), Electronic Speed Controllers (ESC) driver 431 for the thrusters, pressure gauge/sensor 445, digital recording unit (DAR) 413, and seismic payload 411. More or less electronics components may be necessary, such as an inertial measurement unit (IMU), compass, and/or clock. In one embodiment, each of these components and/or electronic sub-systems is arranged on circular or semi-circular plates 405 and distributed/arranged longitudinally through main pressure housing body 401. In one embodiment, seismic payload 411 comprises three geophones in a standard geophone arrangement and is rigidly mounted to a side of the cylindrical housing. Of course, any combination of seismic sensors is possible. In one embodiment, if a 4-component (4C) survey is desired, the seismic sensors may comprise a hydrophone and three or more particle velocity sensors (e.g., geophones, accelerometers, magnetometers, etc.). The main pressure housing may also be directly coupled to one or more external components, such as hydrophone 453 and external plug connector 451 (for data transfer and power charging of the AUV). While FIG. 4 shows one example of the arrangement of the internal components within the pressure housing, other arrangements are also possible. For example, in some embodiments (such as that described in FIG. 6A), the ESC driver for the thrusters is located outside of the pressure housing. Further, the AUV may have an on/off switch (not shown) that may be located at least partially outside of the pressure housing. In still other embodiments, one or more battery packs may be located within the housing (which may function as a primary or supplemental power supply to the AUV).

Figure 5A:
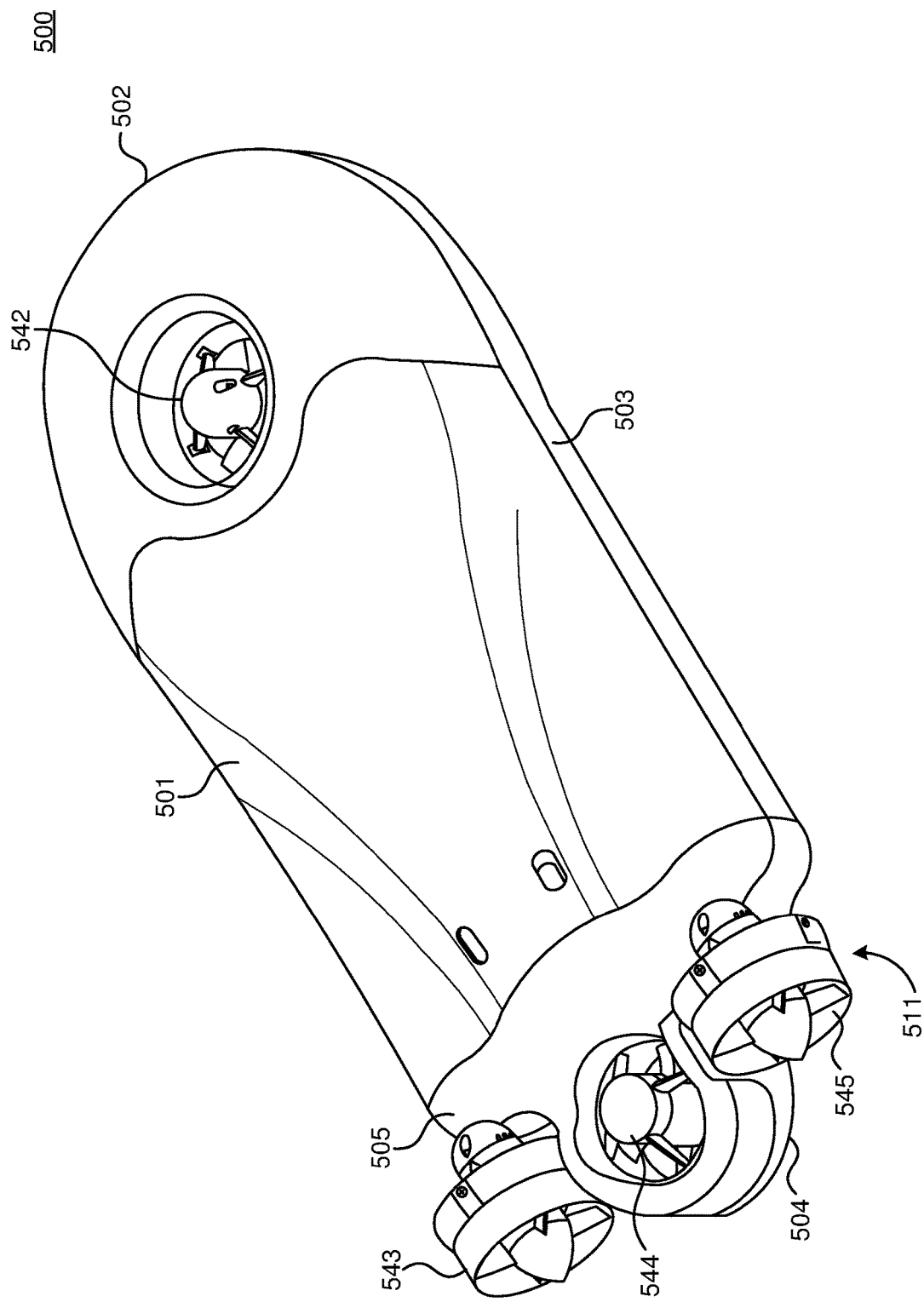
FIGS. 5A-5E illustrate various views of a seismic AUV according to another embodiment of the present disclosure.
Figure 5B:
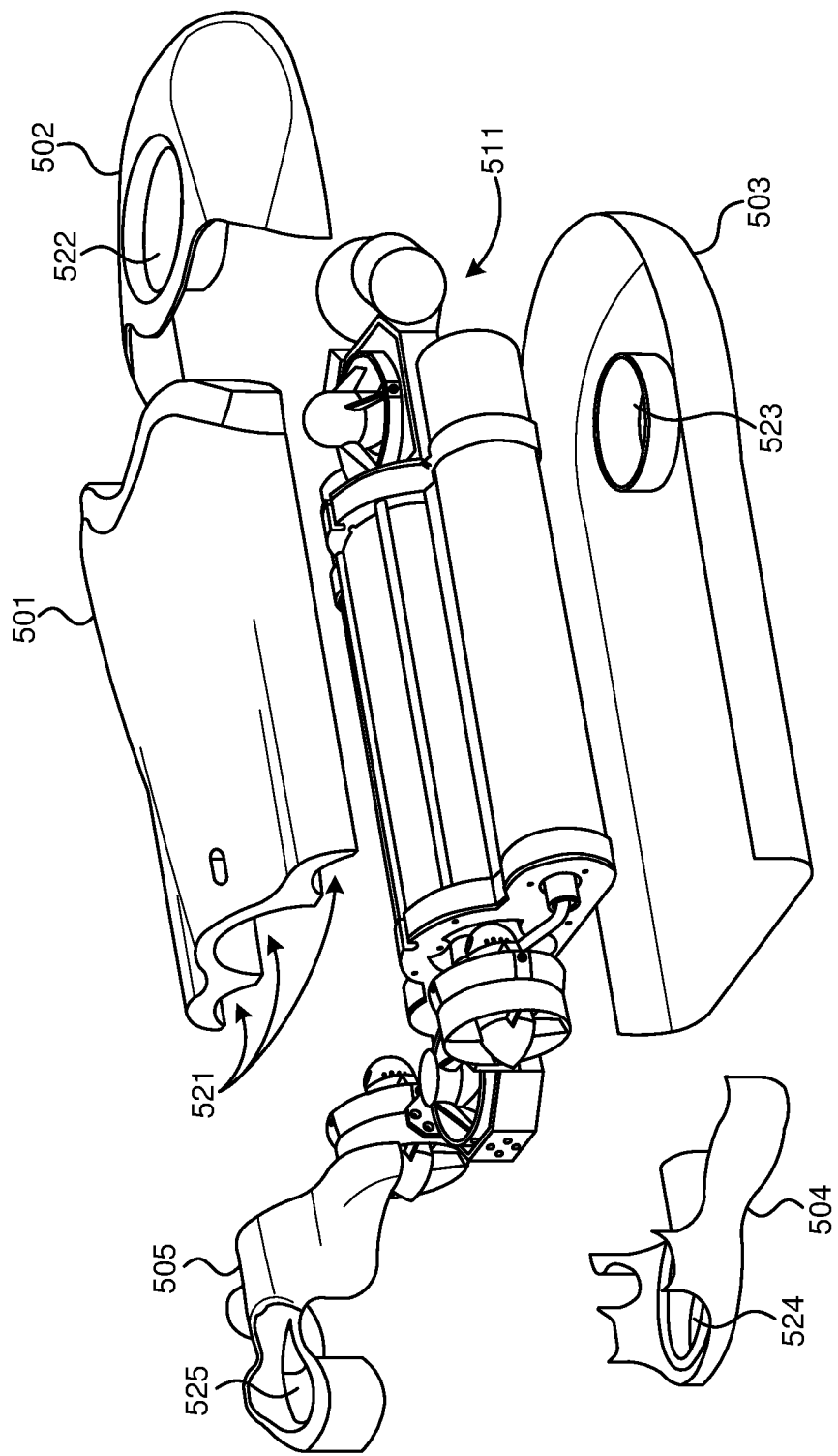
Figure 5C:
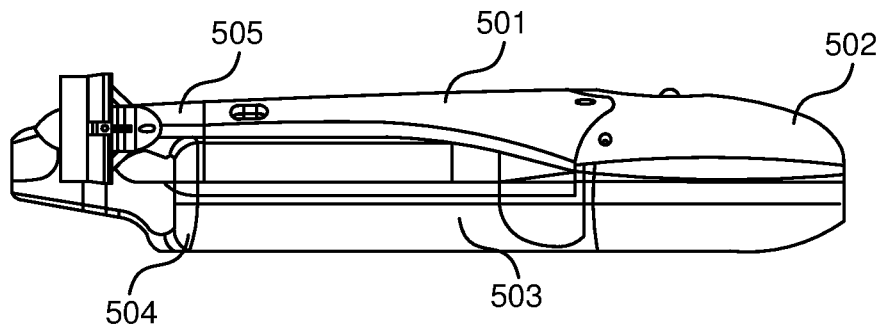
Figure 5D:
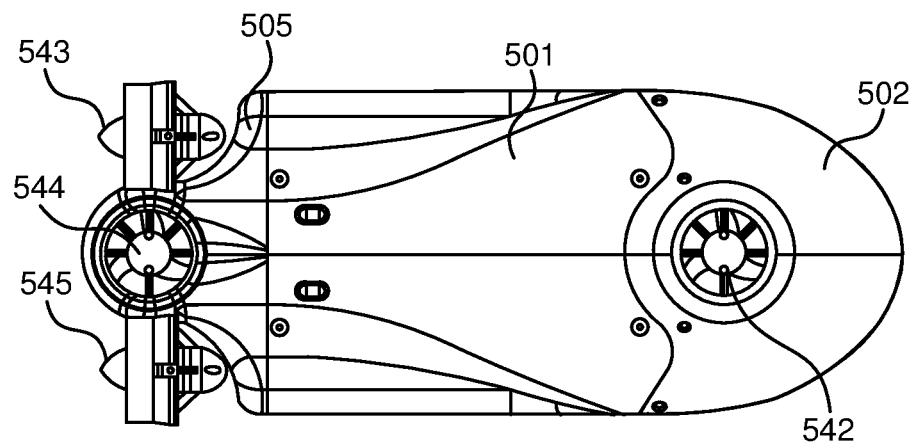
Figure 5E:
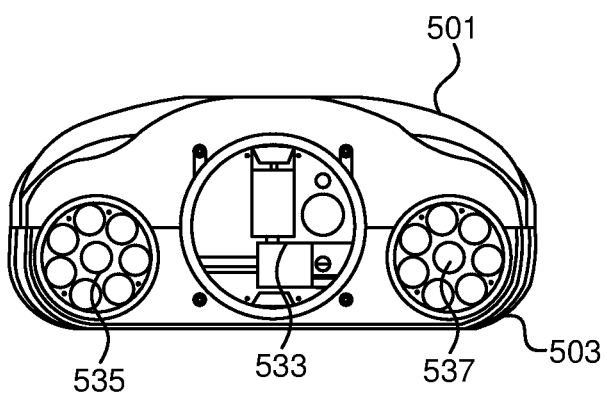

FIGS. 5A-5E illustrate various views of an AUV according to one embodiment of the present disclosure. In one embodiment, the seismic AUV (or components thereof) described in FIGS. 5A-5E may be substantially similar to the seismic AUV illustrated in FIGS. 2A-2D. FIG. 5A illustrates a perspective view of one embodiment of seismic AUV 500, which may be substantially similar to seismic AUV 200. FIG. 5B illustrates an exploded view of seismic AUV 500, while FIGS. 5C, 5D, and 5E illustrate a side, top, and cross-sectional view, respectively.

As illustrated in FIGS. 5A-5D, seismic AUV 500 may comprise a plurality of external casings or housings that together provide or form the exterior shape of the AUV. In one embodiment, the AUV external body may comprise upper foam cover 501, front cover 502, bottom cover 503, and upper rear cover 505. In some embodiments, the lower housing of the AUV may additionally comprise a separate section, such as lower rear cover 504. Each of these components may be removably connected to each other via any number of locking or fastening mechanisms, including snaps, clips, latches, screws, bolts, and the like. In another embodiment, each of the body components may be individually coupled to AUV electronic assembly 511. The external body of the AUV provides protection to the internal electronic components, coupling of the AUV to the seabed, handling of the AUV on a back deck of a surface vessel, and hydrodynamics of the AUV.

Similar to buoyant body 201, upper foam cover 501 may comprise a flotation material (such as syntactic foam or some other buoyant material) to offset the remaining components of the AUV that are substantially negatively buoyant. The remaining casing components/covers may be substantially plastic, such as an ABS plastic or similar material. Similar to head cover 221, front cover 502 may be substantially transparent to acoustic communications (and enclose one or more acoustic devices). In one embodiment, lower plate 503 is substantially flat, which increases the seabed coupling for the AUV. In one embodiment, AUV 500 has a weight in sea water of approximately 5 kg and a buoyancy of approximately 12 kg. As illustrated in FIGS. 5C and 5D, the width of the AUV is greater than the height of the AUV. As illustrated in FIGS. 5C and 5E, the bottom of the AUV may be substantially flat, which increases the seabed coupling capabilities of the AUV.

As illustrated in FIG. 5B, upper foam cover 501 may comprise a plurality of recesses 521 that are configured to receive and/or couple with a plurality of pressure housings and/or internal electronic components. Front cover 502 may comprise opening 522 that is configured to receive front vertical thruster 542 (or a portion thereof), and bottom cover 503 comprises opening 523 that is configured to receive front vertical thruster 542 (or a portion thereof). In one embodiment, opening 522 is coupled to opening 523. Similarly, rear cover 505 may comprise opening 525 that is configured to receive rear vertical thruster 544 (or a portion thereof), and bottom cover 504 comprises opening 524 (which may also be located in lower bottom cover 503) that is similarly situated to receive rear vertical thruster 544 (or a portion thereof). In one embodiment, opening 525 is coupled to opening 524.

The AUV may comprise a propulsion system as is known in the art. In one embodiment, it has a front vertical thruster 542, a back vertical thruster 544, and two rear thrusters 543, 545. Each of the thrusters may be rim driven thrusters. Thus, the propulsion system arrangement is similar to that described for seismic AUV 200 but provides an additional vertical thruster located at a rear portion of the AUV. In one embodiment, the angle and/or orientation of each of the thrusters is variable based on the intended direction of the AUV. Thus, the rotational direction of the thrusters may be variable (clockwise and/or counter-clockwise) as well as the angle of the thruster itself. In one embodiment, the rear vertical thruster may be situated between the two rear horizontal thrusters and may be coupled together (as illustrated in FIGS. 5B and 6C) by a bracket or similar assembly and then separately attached to the main pressure housing.

As illustrated in FIG. 5B, the external body of the AUV substantially encloses and protects the AUV electronic components. For example, in one embodiment, each of the electronics components may be attached to each other and form electronics assembly or system 511, which may be substantially enclosed by external casings 501-505 of the AUV. In one embodiment, each of the electronic components are rigidly coupled together to form AUV electronic assembly 511. FIG. 5E illustrates a cross-section of the AUV. As described in more detail herein for other embodiments, main pressure housing 533 is substantially cylindrical, and comprises various electronic components of the AUV such as one or more seismic sensors, a digital recorder (DAR), clock, CPU, and various circuit boards for the AUV avionics and acoustic devices. On either side of the main pressure housing comprises an additional cylindrical pressure housing 535, 537 that contains battery packs for the AUV. Each of these cylindrical housings may be substantially aluminum.

Figure 6A:
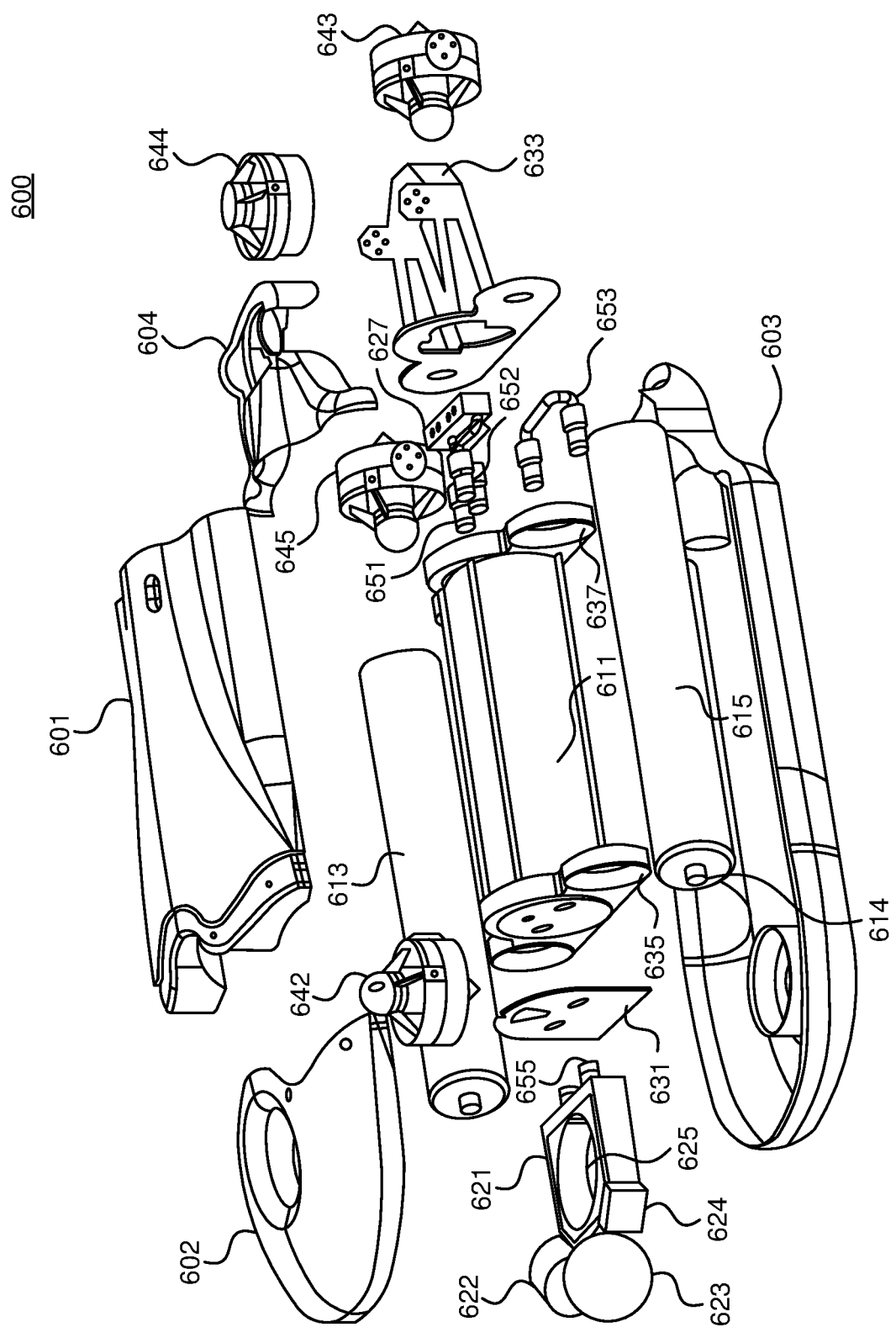
FIG. 6A illustrates an exploded view of the seismic AUV from FIGS. 5A-5E.
Figure 6B:
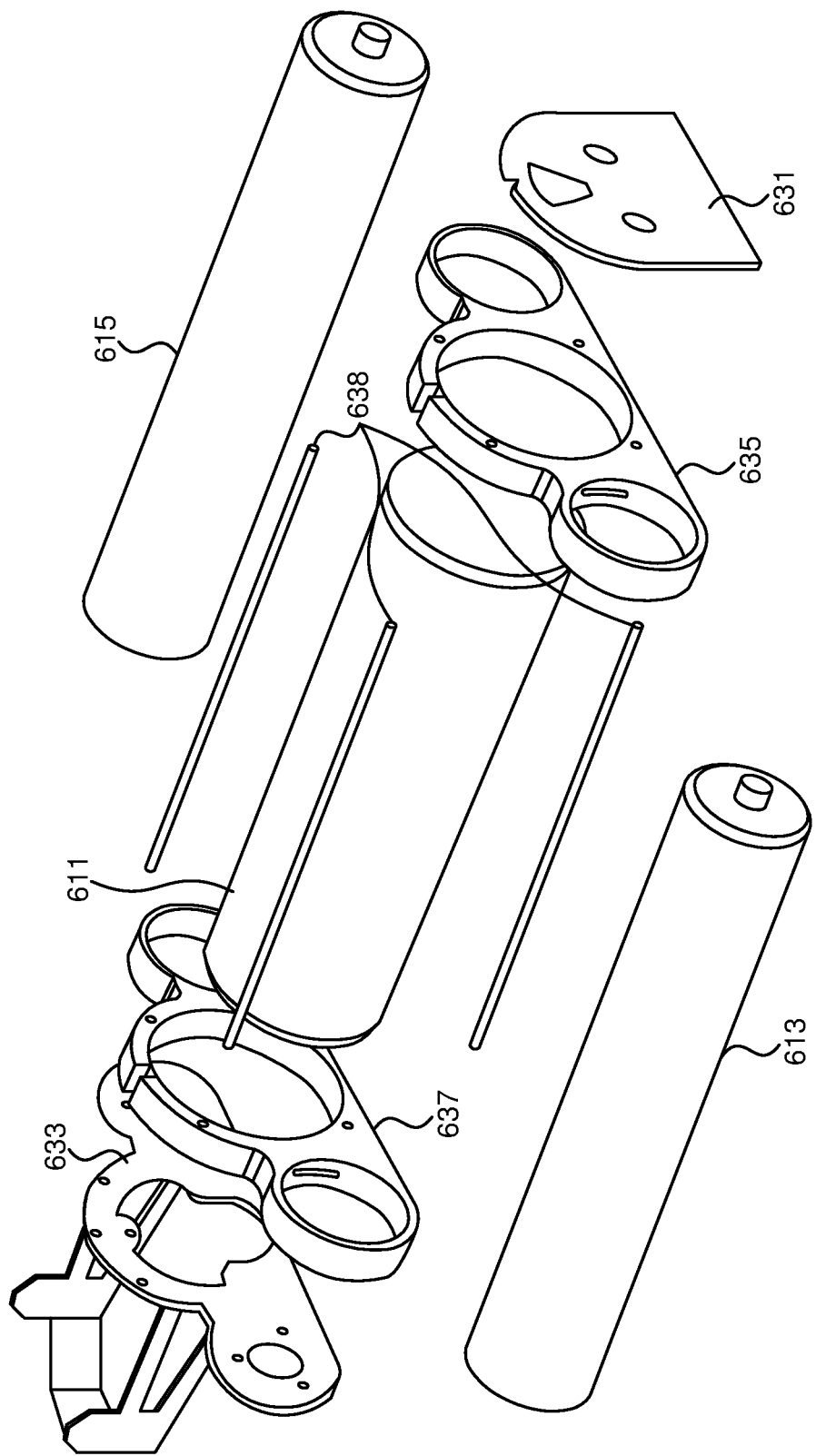
FIG. 6B illustrates an exploded view of the electronics package assembly of the seismic AUV of FIG. 6A.
Figure 6C:
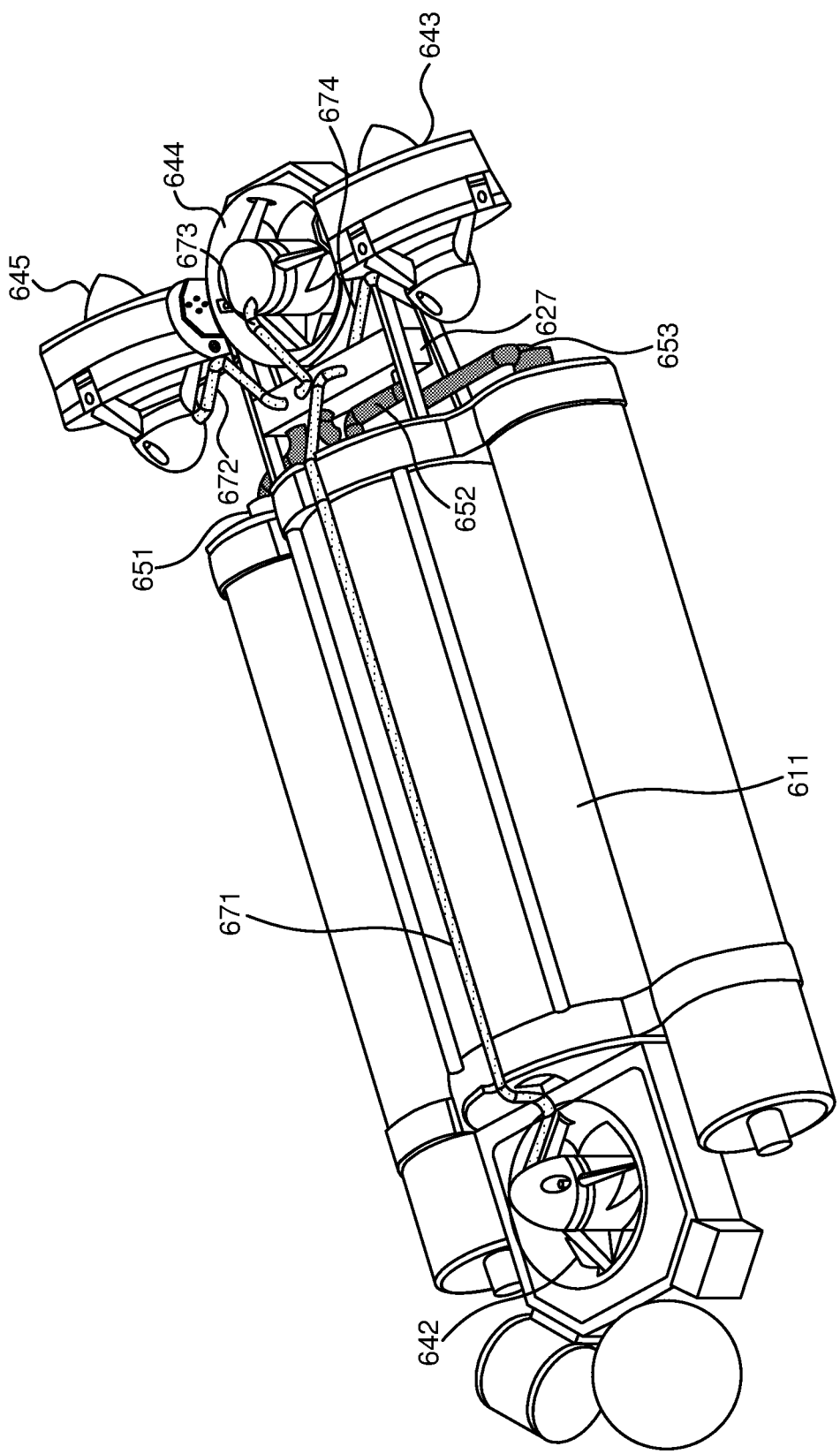
FIG. 6C illustrates an assembled view of the electronics package assembly of the seismic AUV of FIG. 6A.

FIGS. 6A-6C illustrate various views of a seismic AUV according to one embodiment of the present disclosure. In one embodiment, the seismic AUV (or components thereof) described in FIGS. 6A-6C may be substantially similar to that illustrated in FIGS. 5A-5E. FIG. 6A illustrates an exploded view of a seismic AUV according to one embodiment of the present disclosure. FIG. 6B illustrates an exploded view of the electronics package assembly of a seismic AUV according to one embodiment of the present disclosure. FIG. 6C illustrates an assembled view of the electronics package assembly of a seismic AUV according to one embodiment of the present disclosure.

As illustrated in FIG. 6A, the external body of AUV 600 may be formed of upper shell 601, front upper cover 602, lower cover 603, and rear upper cover 604. When coupled together, these components form a protective shell for the enclosed electronic components. In one embodiment, the AUV comprises a plurality of pressure housings that each enclose electronic components. For example, a main cylindrical pressure housing 611 may form the center part of the electronics package and include (as detailed herein) one or more seismic sensors, a digital recorder (DAR), clock, CPU, and various circuit boards for the AUV avionics and acoustic devices. Secondary cylindrical pressure housings 613, 615 may be located on either side of the main pressure housing 611 and comprise a plurality of battery packs. Each of the pressure housings may be connected together by external electrical connections 651, 653, which may be underwater cable, wires within a rigid conduit, or other similar electronic connections. Further, each of the pressure housings may have one or more pressure relief valves 614.

In one embodiment, a plurality of external devices may be electronically coupled to main pressure housing 611. For example, the AUV may comprise a propulsion system (such as vertical and horizontal thrusters) and various acoustic devices that need to be external of the pressure housing but still electronically coupled to the electronics within the pressure housing. To minimize the external connections to the pressure housing (which each need to be watertight at significant pressure and water depths), each of the thrusters of the propulsion system is electrically connected to electronic speed controller (ESC) housing 627, which is separately connected to pressure housing 611 via electrical connection 652. As illustrated in FIG. 6C, front vertical thruster 642 is electrically coupled to housing 627 via underwater cable 671, rear vertical thruster 644 is electrically coupled to housing 627 via underwater cable 673, first rear horizontal thruster 643 is electrically coupled to housing 627 via underwater cable 674, and second rear horizontal thruster 645 is electrically coupled to housing 627 via underwater cable 672. Other electrical connections may similarly be used.

The AUV may also have acoustic bracket 621 that is coupled to the main pressure housing via one or more external connections 655. This design allows a plurality of acoustic devices and/or sensors to be electrically (and physically) coupled to the bracket as opposed to each being separately connected to the pressure housing with separate electronic (and watertight) connections, thereby minimizing the connections to the main pressure housing. The acoustic bracket 621 functions as a central hub and/or hub connector for a plurality of external devices to be coupled to the AUV and/or main pressure housing. For example, hydrophone 622, acoustic device 623, and echosounder 624 may be coupled to acoustic bracket 621. In various embodiments, acoustic transducer 623 may be an acoustic modem, a transducer, and/or a phased array receiver, etc., and may be configured to receive and/or communicate with external acoustic devices to the AUV for communication and/or guidance purposes, which may be necessary for LBL, USBL, phased array, and other guidance protocols. Each device may be electrically and physically coupled to connector/bracket 621, which may be done through a single connection or multiple connections. In one embodiment, acoustic bracket 621 is arranged in a substantially ring-shaped configuration with opening 625 in the middle of the bracket. The external acoustic devices may be arranged on an external periphery of the acoustic bracket. Opening 625 may be fluidly coupled to corresponding openings of the upper front casing 602 and lower casing 603. In one embodiment, front vertical thruster 642 is configured to be placed within opening 625, as illustrated in FIG. 6C. In one embodiment, the acoustic devices may extend outside of the AUV body. In other embodiments, as illustrated in FIGS. 5A-5E and 6A, the AUV body is substantially flush with no devices substantially extending outside of the AUV body. For example, acoustic devices 622, 623, and 624 reside within the AUV body casing, such that upper case 602 and lower case 603 protects the acoustic devices. In such an embodiment, some of the external body casing needs to be acoustically transparent to allow acoustic communications to and from the AUV head. For example, in one embodiment, upper front casing 602 is acoustically transparent. In some embodiments, the acoustic bracket may have additional electrical connections to provide components that can be removably attached and detached to the AUV depending on the particular survey requirements. For example, Wi-Fi and optical devices may also be coupled to the AUV, such as being attached via bracket 621.

As illustrated in FIGS. 6A and 6B, pressure housings 611 and 613, 615 may be coupled together by a front housing bracket 635 and a rear housing bracket 637, with each bracket having a plurality of openings arranged to receive a portion of the cylindrical pressure housings. A plurality of rods 638 may couple each of the front and rear housing brackets 635, 637 together to rigidly couple the three pressure housings together. In one embodiment, the AUV may have a plurality of external device brackets, such as front device bracket 631 and rear device bracket 633. Front device bracket 631 is coupled to the front of main pressure housing 611 and is configured with openings to receive various external devices, such as one or more openings for acoustic bracket 621. Likewise, rear device bracket 633 is coupled to the rear of main pressure housing 611 and is arranged to hold vertical thruster 644 and horizontal thrusters 643, 645. Thus, rear device bracket 633 is configured as a thruster bracket.

Operation

The versatility of the disclosed seismic AUV allows it to be utilized in a wide variety of subsea deployment and retrieval operations. As is known in the art, the AUVs may be deployed from the surface vessel by any number of mechanisms, and once the AUVs have performed the seismic recording on the seabed, they may be recovered from the seabed by a variety of mechanisms. In general, the particular deployment and recovery method (including any guidance protocols) of the AUVs is not limited by this invention.

For example, the AUV may be configured to move to a particular subsea location based on a transducer on the AUV communicating with another subsea device or surface vessel. The AUV can be dropped and/or deployed from a surface vessel and travel near or to the seabed at a predetermined location based on predetermined positions. After the desired number of seismic surveys has been performed with the AUV on the ocean bottom, the AUV may travel back up to the surface vessel for recovery. As another example, the AUV may be deployed with an ROV, skid, cage, or subsea station from a surface vessel and be positioned on or near the seabed based on acoustic communications with the AUV and a separate device, similar to the method described in Applicant's U.S. Patent Publication No. 2016/0121983, incorporated herein by reference. The AUVs may be instructed to deploy from the ROV, skid, cage, or subsea station to a predetermined location on or near the seabed for seismic data recordings. In other embodiments, instead of instructing the AUV to fly to a predetermined position, the AUV may receive range and bearing to the target updates at regular intervals. The AUV may then calculate the necessary action to reach the target destination. In yet another embodiment, the AUV is directly guided from the onboard acoustic positioning system of the AUV. In this mode, the AUV may receive instructions of heading, speed, and pitch in its route and/or path to the target destination. In some embodiments, an ROV or subsea station may be coupled to a cage with the AUVs and transfer those AUVs to the ROV or subsea station for deployment. Likewise, for recovery, the AUVs may travel to the ROV, skid, cage, or subsea station after the seismic survey is completed. The ROV may or may not facilitate recovery of the AUV into the intended recovery station. Likewise, in some situations, a robotic manipulator arm of an ROV may be used to grab, place, or position a plurality of AUVs from one subsea location to another subsea location. For example, a plurality of AUVs may be commanded to travel to a particular subsea location on the seabed, and the ROV may then travel to that subsea location and grab each of the AUVs and place them in a skid of the ROV or a subsea basket or station. In some embodiments, an ROV is used to recover the AUVs only and is not used to deploy the AUVs. In some embodiments, an ROV is not used at all and an intelligent subsea station configured with an acoustic system is used to facilitate deployment and retrieval of the AUVs.

As described above and as is known in the art, the AUVs may be deployed directly from a surface vessel or from a subsea station, such as an ROV or subsea basket. Various acoustic devices on the AUV may be utilized during subsea travel and during seismic recording on the seabed. The AUVs may be recovered back to the same surface vessel that deployed the AUV, or to a dedicated recovery vessel that may be located on the surface or at a subsea position (such as an ROV or subsea basket). During subsea movement of the AUV, one or more of the thrusters of the propulsion system may be specifically operated to steer the AUV to the intended destination. In general, the use of the horizontal and/or vertical thrusters for the seismic AUV during subsea travel, seabed landing, and seabed take-off are described in detail in Applicant's U.S. Patent Publication No. 2017/0137098, incorporated herein by reference. In one embodiment, the horizontal thrusters are used to provide general subsea movement and the vertical thrusters are used generally for flight stability. For example, due to the negative buoyancy of the AUV, in one embodiment the vertical thrusters are not used during travel to the seabed other than general flight stability. However, during take-off from the seabed the front and/or rear vertical thrusters may be actuated to help detach the AUV from the seabed and to move the AUV vertically upwards. In one embodiment, the AUV has a homing array that is utilized to guide the AUV to a recovery basket after seismic recording has completed. In still other embodiments, retractable wings on the AUV may be retracted and/or extended for particular operations. For example, the wings may be retracted while landing on the seabed (or after landing) for seismic seabed recording. The wings may be retracted while the AUV is being recovered onto a surface vessel or being deployed from a surface vessel or during general storage of the AUV. The wings may be extended during subsea travel to improve the gliding abilities of the AUV, which may also allow the propulsion system to be intermittently turned off. Again, the versatility of the disclosed seismic AUV allows it to be utilized in a wide variety of subsea deployment and retrieval operations, and the particular deployment and recovery method of the AUVs is not limited by this invention.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the arrangement and make-up of the AUV electronic and physical configuration are within the scope of the invention. For example, the AUV may be of any configuration, and may be designed to couple to the seabed or merely near the seabed. The pressure housings may be cylindrical or other shapes, and may be made of metal (such as aluminum) or non-metal substances (e.g., carbon fiber). More or less electronic components may be located within the main pressure housing and/or secondary pressure housings. A different propulsion system may be utilized besides thrusters (such as jet pumps, etc.), the thrusters may be arranged at different positions of the AUV than described herein, and either one or two vertical thrusters (or more) may be utilized. Further, while the described AUV is directed to seismic sensors, it may also be applicable to other marine AUVs where seabed or non-seabed signals need to be recorded. Still further, the AUV may have fixed or retractable wings, and the wings may be retracted during seabed coupling and surface vessel handling and extended during subsea travel to improve the gliding characteristics of the AUV. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An autonomous underwater vehicle (AUV) for recording seismic signals on the ocean bottom during a marine seismic survey, the AUV comprising:
   a propulsion system configured to propel and steer the AUV while travelling underwater;
   one or more seismic sensors configured to record seismic signals while the AUV is resting on the bottom of the ocean;
   a plurality of pressure vessels each housing a plurality of electronic components; and
   an exterior shell that substantially encloses the plurality of pressure vessels, wherein the shell comprises a lower section that is substantially flat and is configured to couple with the seabed,
   wherein the shell comprises an upper section that is positively buoyant and is formed of a flotation material.

2. The AUV of claim 1, wherein a width of the AUV is greater than a height of the AUV.

3. The AUV of claim 1, wherein the upper section and the lower section are separate components that are configured to couple together around the plurality of pressure vessels.

4. The AUV of claim 1, wherein each of the plurality of pressure vessels is separate and arranged to be electrically coupled together by one or more conduits external to the plurality of pressure vessels.

5. The AUV of claim 1, wherein the plurality of pressure vessels comprises
   a main pressure housing that comprises at least a digital autonomous recorder (DAR), one or more seismic sensors, and a clock;
   a first pressure housing that comprises a first plurality of battery cells, and
   a second pressure housing that comprises a second plurality of battery cells.

6. The AUV of claim 5, wherein the main pressure housing is arranged in substantially the middle of the AUV and the first and second pressure housings are arranged on either side of the main pressure housing.

7. The AUV of claim 1, wherein the AUV comprises a plurality of retractable wings.

8. An autonomous underwater vehicle (AUV) for recording seismic signals on the ocean bottom during a marine seismic survey, the AUV comprising:
   a propulsion system configured to propel and steer the AUV while travelling underwater;
   one or more seismic sensors configured to record seismic signals while the AUV is resting on the bottom of the ocean;
   one or more pressure vessels housing a plurality of electronic components; and
   a plurality of casing components that when coupled together form an exterior shell that substantially encloses the one or more pressure vessels,
   wherein the plurality of casing components comprises an upper section and a lower section, wherein the lower section is configured to couple with the seabed,
   wherein a shape of the upper section and the lower section is configured to provide lift to the AUV during subsea travel,
   wherein a width of the AUV is greater than a height of the AUV,
   wherein the upper section is positively buoyant and is formed of a flotation material,
   wherein the lower section is substantially flat.

* * * * *